Jan. 16, 1951   F. FANTINI   2,538,192
HUMIDITY AND TEMPERATURE RESPONSIVE
CONTROL APPARATUS
Filed Feb. 26, 1948
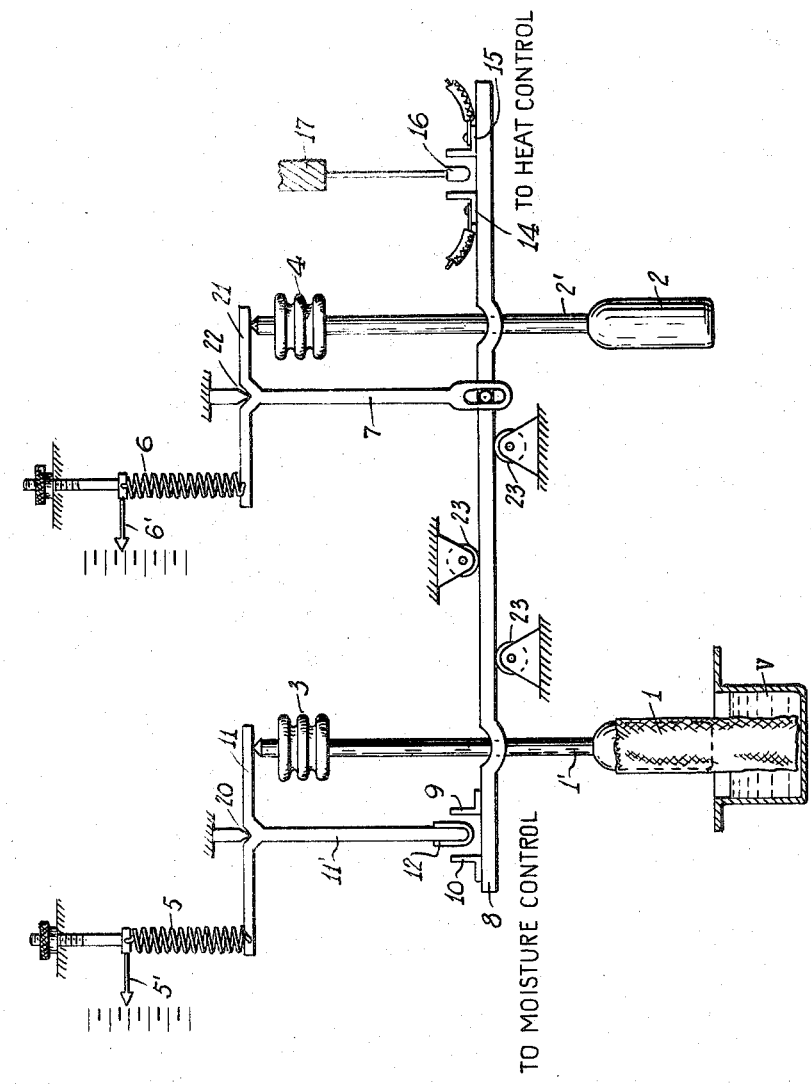
INVENTOR.
FRANCESCO FANTINI.
BY
ATTORNEY.

UNITED STATES PATENT OFFICE 2,538,192

HUMIDITY AND TEMPERATURE RESPONSIVE CONTROL APPARATUS

Francesco Fantini, Milan, Italy

Application February 26, 1948, Serial No. 11,238
In Italy January 2, 1947

Section 1, Public Law 690, August 8, 1946
Patent expires January 2, 1967

3 Claims. (Cl. 200—52)

The present invention relates to a control apparatus which through the operation of electrical contacts actuates regulator members in response to the percentage of relative humidity and to the temperature prevailing in a drier, in rooms or other premises whatever. Thereby in said rooms there are maintained constant relative humidity and temperature, which is generally convenient and sometimes even necessary, especially so in the industrial drying processes.

The invention, for the part concerning the humidity control, is characterized by the combination of two devices, the first of which acts in response to the relative humidity of the atmosphere, and the second one in response to the temperature, said two devices cooperating so as to signal only the changes in relative humidity, independently from changes in ambient temperature.

Preferably said devices mentioned above are constituted by a bulb filled with saturated heat responsive gases one of said bulbs operating in a wet condition and the other one in a dry condition. The wet bulb is connected through a spring biased system of links and rods to a contact movable between two other contacts in their turn movable by way of a similar lever and rods linkage by the dry bulb, so that the closing of the contacts, apt to shut off or to initiate the discharge of moisture, or to cause the admission or the exhaustion of damp air, is dependent upon the wet bulb operation only that is upon the degree of humidity in the atmosphere.

Further, the combination in the apparatus of a contact device actuated by the dry temperature responsive control element allows to eliminate the drawbacks that are met in practice by the use of two different devices that rarely are identical in sensibility, thermic inertia, and position of installation.

The invention shall now be described more in detail with reference to the accompanying drawing which represents schematically one of the embodiments of an apparatus according to the invention.

The apparatus consists of two bulbs 1 and 2, containing heat responsive saturated vapors, one of which is kept wet by a cloth sleeve dipping in a water cup V.

Bulb 1 is connected through a pipe 1' to a bellows 3, operating on a lever 11, pivoted in 20, and on which acts a spring 5 adjustable according to the temperature corresponding to the humidity which it is wanted to maintain in the atmosphere, and provided for this purpose with a pointer 5'.

Lever 11 transmits its movement to a lever 11', to which is linked contact 12, movable between two contacts 9, 10. Said contacts 9, 10 are fixed on a rod 8 which is displaced by the temperature control device constituted by dry bulb 2, connected through pipe 2' to bellows 4 that acts on lever 21, pivoted in 22 and biased by a spring 6, adjustable according to the wanted temperature, by means of pointer 6'.

Temperature changes in respect to the predetermined value cause an angular movement of lever 7 that shifts rod 8. The displacement of rod 8 is rectilineal due to the guiding idlers 23.

The operation of the apparatus as a humidity control device is the following: If it is wanted for instance that in the atmosphere to be controlled the percentage of relative humidity be maintained at a value of say 80% and the mean temperature at a value of say 25° C., from a common psychrometric chart it is found that at a temperature of 25° C. and a humidity of 80% the wet thermometer reads 22.5° C. The adjusting spring 5 is then set on the value of 22.5° C. and adjusting spring 6 is accordingly set on the value of 25° C.

Contact 12 is thus found to be in the intermediate position between contacts 9 and 10 only if the wanted conditions are really existing.

If the humidity percentage for instance decreases, the evaporation from the wet cloth increases and therefore the temperature drops, bringing about a pressure reduction within bellows 3, which contracts and moves through levers 11, 11' contact 12 towards contact 10, since the temperature difference for which the springs have been set has increased, while contacts 9 and 10 have not moved. The opposite happens if the humidity increases because the temperature difference between bulbs 1 and 2 decreases, since the temperature of bulb 1 increases, and thereby, contact 9 is closed. Contacts 9 and 10 are electrically connected with the humidity regulator members so that after a certain lapse of time the relative humidity is brought again to the wanted value by effect of the called for regulation, and contact 12 is reset again in a position intermediate between contacts 9 and 10.

Should a change of temperature take place in the atmosphere, in respect to the predetermined 25° C. value, bulb 2 through bellows 4 causes the shifting of rod 8, that displaces thereby to the right or to the left both contacts 9 and 10; the distance however between said contacts and the intermediate contact 12 remains unaffected because this last contact in its turn has been shifted by effect of the changes occurring in bulb 1, due to the change in ambient temperature. Thus the temperature change has no effect on the closing of contacts 9 and 10 and the operation of the regulator members is dependent only upon the degree of humidity prevailing in the atmosphere.

In the diagram there has been illustrated also the combination of an automatic device for the control of the temperature, constituted by a resilient contact 16, pivoted in 17, which under normal conditions is positioned intermediate between contacts 14 and 15 fast with rod 8.

Any change in ambient temperature causes a change in pressure in bulb 2 which, through bellows 4 and lever 7, shifts rod 8 in the one or the other direction.

It is thus obtained that contact 16 engage contacts 14 or 15 causing the intervention of the regulator members for the generation of heat.

The apparatus therefore combines with the ambient temperature control device, necessary for detecting the relative humidity, also, the temperature control device.

Of course, the above described apparatus is shown only by the way of an example, and its constructive details, the contact arrangement, which may be different and if desired of the potentiometric type, as well as the type of heat responsive devices, may vary according to needs without therefore departing from the scope and spirit of the present invention.

What I claim is:

1. In a space heating and humidifying device having means for discharging moisture into the space, means for heating the space, and electrical actuating circuits for each of said means; apparatus for controlling the humidity and temperature of the space, said apparatus comprising a temperature responsive first device, a temperature and humidity responsive second device, a first pivoted T-shaped lever having a center arm and a cross arm, one extremity of the cross arm being coupled with said first device so that the latter exerts a pressure thereon varying with the temperature in said space, a first adjustable spring exerting a balancing pressure upon the other extremity of said cross arm, a rod carrying a first and a second pair of contacts for connection in the actuating circuits of said heating means and said humidifying means, respectively, said rod being pivotally linked with said center arm, a stationary contact for connection in the actuating circuit of said heating means and adapted to cooperate with either contact of said first pair upon displacement of said rod in one or the other direction, respectively, so as to compensate any change in temperature resulting in a displacement of said first lever, a second pivoted T-shaped lever having a center arm and a cross arm, one extremity of the last-mentioned cross arm being coupled with said second device so that the latter exerts a pressure thereon varying with the temperature and with the humidity in said room, a second adjustable spring exerting a balancing pressure upon the other extremity of said last-mentioned cross arm, another contact carried by the center arm of said second lever for connection in the actuating circuit of the humidifying means, said other contact being adapted to cooperate with either contact of said second pair upon displacement of the second lever in one or the other direction, respectively, so as to compensate any change in humidity resulting in a displacement of said second lever alone, said rod being arranged to move in the same direction as said other contact when both levers are displaced as the result of temperature changes, whereby said other contact will remain disengaged from the contacts of said other pair.

2. In an apparatus for maintaining both the temperature and the humidity of a surrounding atmosphere at predetermined levels including circuit means for regulating the generation of heat in the atmosphere and circuit means for regulating the discharge of moisture into the atmosphere, control means comprising a dry bulb containing a saturated heat-responsive vapor, a first lever, first bellows connected with the interior of said bulb and positioned adjacent said lever in such manner as to exert a variable pressure upon said lever, first spring means connected with said lever so as to counteract said pressure, a wet bulb containing a saturated heat-responsive vapor, a second lever, second bellows connected with the interior of said wet bulb and positioned adjacent said second lever in such manner as to exert a variable pressure upon the latter lever, second spring means connected with said second lever so as to counteract the pressure from said second bellows, a rod carrying a first and a second pair of contacts for connection in the heat generation and moisture discharge regulating circuits, respectively, said rod being connected with said first lever for displacement by the latter upon changes in the pressure in said dry bulb, a stationary contact for connection in the heat generation regulating circuit adapted to cooperate with either contact of said first pair upon displacement of said rod in one or the other direction, respectively, to bring about a compensation of any change in temperature causing a displacement of said rod, another contact carried by said second lever for connection in the moisture discharge regulating circuit and adapted to cooperate with either contact of said second pair upon displacement of said second lever in one or the other direction, respectively, to bring about a compensation of any change in humidity causing the displacement of said second lever alone, said rod being arranged to move in the same direction as said other contact when both levers are displaced as the result of temperature changes in said atmosphere, whereby said other contact will remain disengaged from the contacts of said other pair.

3. An apparatus according to claim 2, further comprising first and second adjusting means for regulating the pressure of said first and second spring means, respectively, and first and second indicator means associated with said first and second adjusting means, respectively, for indicating the temperature and humidity corresponding to any setting of said first and second spring means, respectively

FRANCESCO FANTINI.

REFERENCES CITED

The following references are of record in the file of this patent:

UNITED STATES PATENTS

| Number | Name | Date |
|---|---|---|
| 1,807,306 | Colman | May 26, 1931 |
| 2,059,846 | Bulger | Nov. 3, 1936 |
| 2,088,718 | Philipp | Aug. 3, 1937 |
| 2,201,342 | Lynden et al. | May 21, 1940 |